United States Patent [19]
Izura et al.

[11] 3,943,558
[45] Mar. 9, 1976

[54] APPARATUS FOR REPRODUCING COLORED STILL PICTURE IMAGE

[75] Inventors: Yoshiteru Izura, Toyonaka; Keisuke Okano, Katano, both of Japan

[73] Assignee: Matsushita Electric Industrial Company, Ltd., Osaka, Japan

[22] Filed: Sept. 10, 1973

[21] Appl. No.: 395,438

[30] Foreign Application Priority Data
Sept. 14, 1972 Japan............................. 47-92586

[52] U.S. Cl. ................ 358/1; 360/10; 178/DIG. 3; 178/DIG. 24; 358/14
[51] Int. Cl.²... H04N 9/02; H04N 9/40; H04N 5/78
[58] Field of Search....... 360/10, 8, 35; 178/5.4 CD, 178/5.4 C, 7.5 SE, 5.4 R, 5.2 R, 6.6 FS, DIG. 24, DIG. 28, DIG. 3; 358/11, 4, 14, 1

[56] References Cited
UNITED STATES PATENTS

| | | | |
|---|---|---|---|
| 2,587,006 | 2/1952 | Smith.......................... | 178/DIG. 24 |
| 3,229,035 | 1/1966 | Bounsall ..................... | 178/6.6 |
| 3,484,548 | 12/1969 | Kowal et al.................. | 178/6 |
| 3,781,463 | 12/1973 | van den Bussche .......... | 358/4 |
| 3,812,522 | 5/1974 | Izura et al..................... | 358/1 |

*Primary Examiner*—Howard W. Britton
*Assistant Examiner*—R. John Godfrey
*Attorney, Agent, or Firm*—Stevens, Davis, Miller & Mosher

[57] ABSTRACT

An apparatus in which a luminance signal is recorded onto a first storage tube, the two chrominance signals are compressed to one-half, respectively, in time axis to record alternately such compressed chrominance signals onto a second storage tube, and the signals are repeatedly read out from the first and second storage tubes in order to reproduce the colored still picture image, thereby reproducing the picture image without deteriorating resolution and setting up the apparatus to be free from trouble.

3 Claims, 5 Drawing Figures

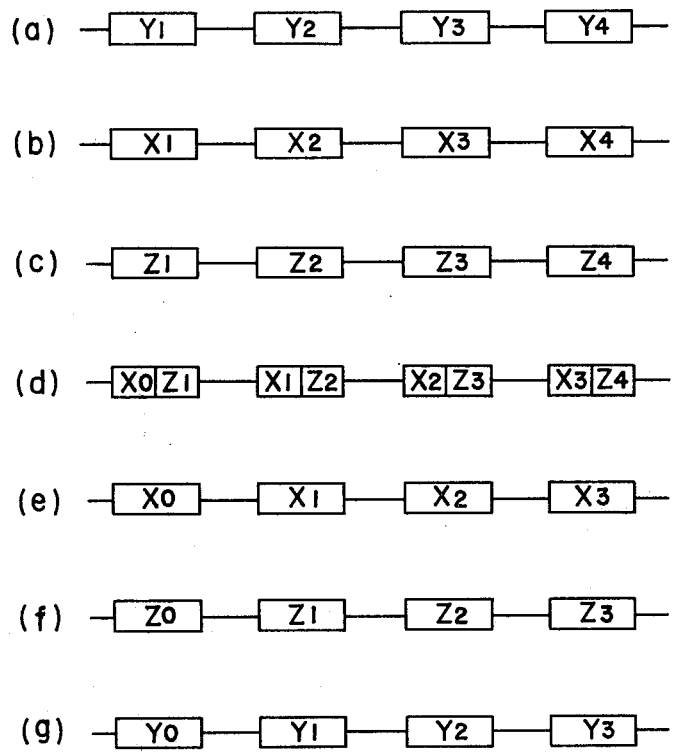

F I G. 4a
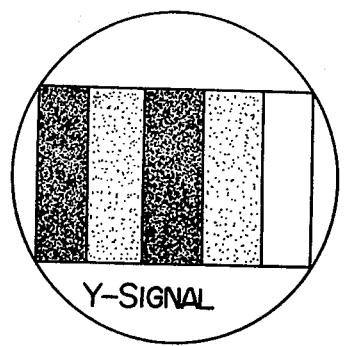
Y-SIGNAL
F I G. 4b
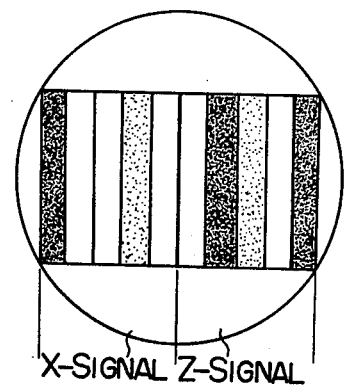
X-SIGNAL  Z-SIGNAL

APPARATUS FOR REPRODUCING COLORED STILL PICTURE IMAGE

This invention relates to an apparatus for reproducing a colored still picture image from the color TV picture image being transmitted.

Apparatus which can reproduce, as a colored still picture, any frame of the signals of a color broadcast television signal on the air, may include video tape recorders, magnetic disc recorders, etc. However, they have poor resolution and require a long period of time to read out the recorded signal. Also mechanical scanning devices inherent to such prior art apparatus often malfunction.

Accordingly, an object of this invention is to provide an apparatus in which purely electronic recording and reproduction takes place, unlike conventional recording and reproducing apparatus, the apparatus being constituted such that mechanical scanning is not required and accordingly troubles or failures can be eliminated.

It is another object of this invention to provide an apparatus which enables reproduction of the colored picture image a short time after the recording thereof.

It is another object of this invention to increase the resolution of the reproduced picture image.

According to the colored still picture image reproducing apparatus of this invention, since the time-axis compression is effected in the signal system and the two color difference signals are recorded by being separated into two parts, good signal discrimination is obtained without causing the quality of the color pictures to be deteriorated.

Furthermore, according to the invention, as compared to the case in which the chrominance signal is recorded without being compressed in the time-axis but is separated into up and down or left and right, an apparatus can be provided in which the deflection circuit is simplified and further the circuits of the apparatus can be simplified since a complex delay circuit is not required.

Other objects, features and advantages of the present invention will be apparent from the following description taken in conjunction with the accompanying drawings, in which:

FIG. 3 is a schematic representation of waveforms of the signals; and

FIGS. 4a and 4b show the states in which signals are recorded on the target of the storage tube.

Referring to the accompanying drawings, an embodiment of the invention will be described as below.

Figure 1:
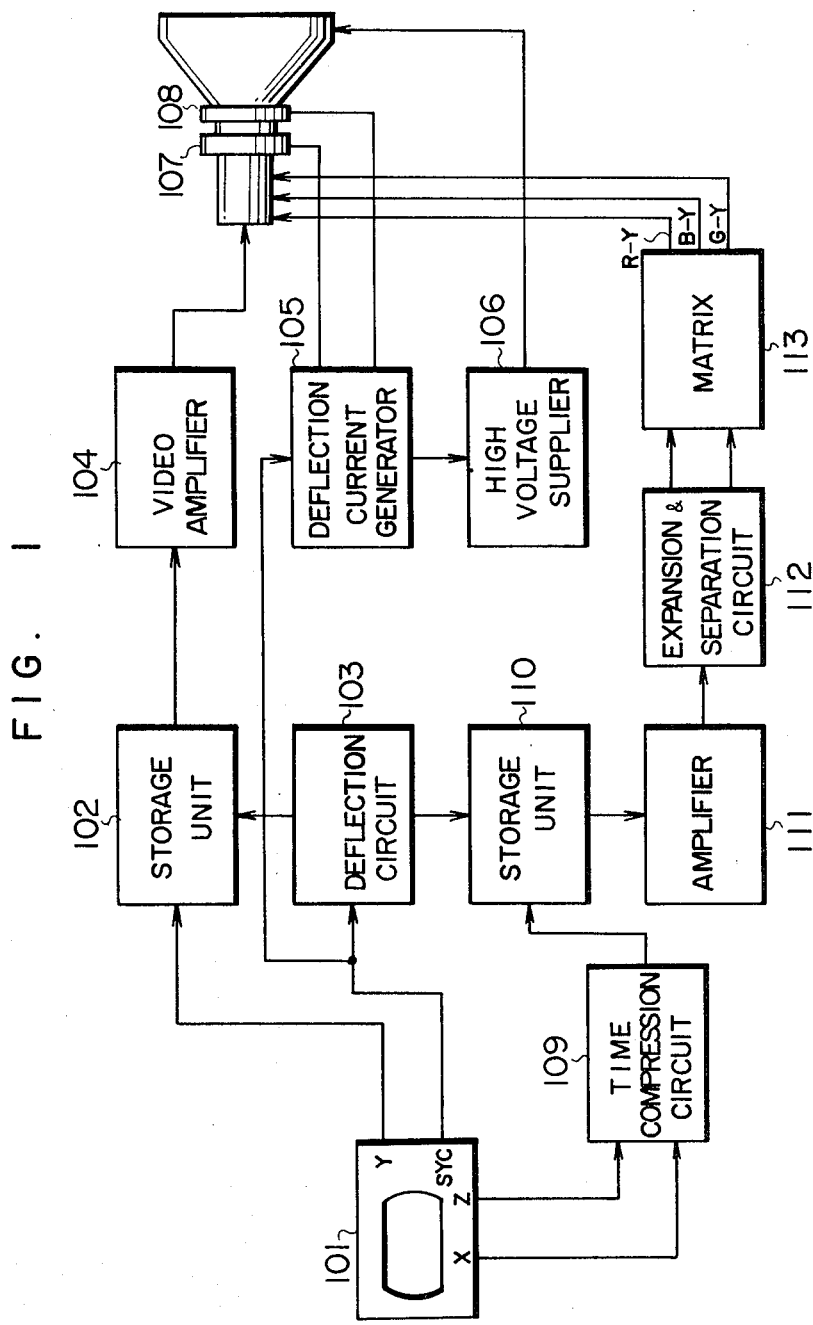
FIG. 1 is a block diagram of a colored still picture image reproducing apparatus, which is an embodiment of this invention.
Figure 2:
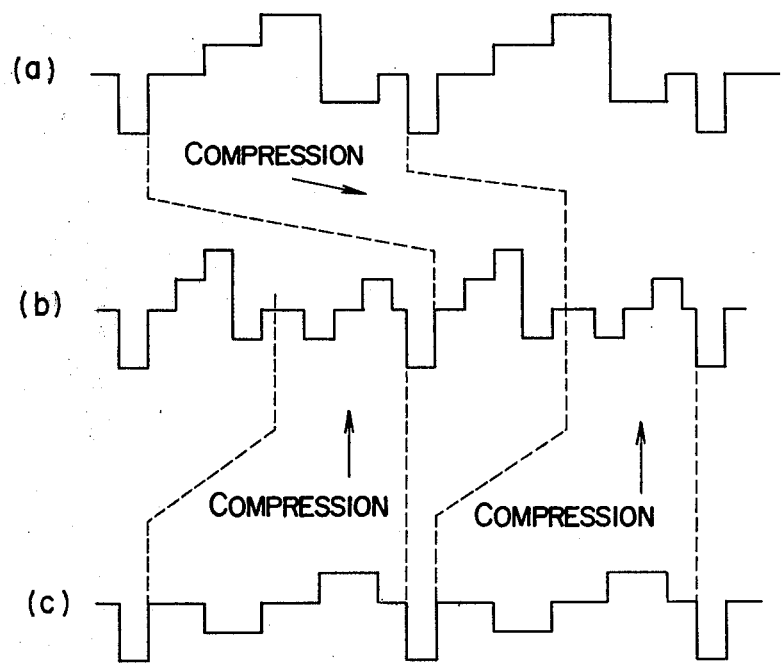
FIG. 2 shows waveforms of the signals.

In FIG. 1 101 represents a color TV receiver set which is so set up that a luminance signal Y, a synchronizing signal SYC, and color signals X and Z can be recovered. 102 designates a luminance signal storage unit having a signal storage tube, 103 a horizontal and vertical deflection circuit including a synchronizing signal separation circuit, 104 a video signal amplifier unit, 105 a deflection current generator unit of a CRT used for monitoring, 106 a high voltage generator unit, 107 a horizontal deflection coil, 108 a vertical deflection coil, 109 a time axis compression circuit, 110 a chrominance signal storage unit having a signal storage tube, 111 a signal amplifier unit, 112 a time axis expansion and separation circuit, and 113 a matrix circuit. In FIG. 2, (a) shows an X signal of one horizontal period (H), (c) shows a Z signal of one horizontal period, and (b) shows a signal composed of these two chrominance signals which have been compressed in time axis to a half scale through the time axis compression circuit, the X signal being delayed by 1 H, and the Z signal being delayed by ½ H. Also, in FIG. 2 (b), the first half represents the X signal and the latter half the Z signal.

FIG. 3 is a schematic representation of signals; wherein (a), (b) and (c) represent a luminance signal Y, and color signals X and Z, respectively, which are obtained from the receiver set 104; (d) represents an output signal of the time axis compression circuit 109; and (e), (f) and (g) represent the outputs of the storage unit 102 at the time of reproduction and of the time axis expansion and separation circuit 112.

Operation of the apparatus as shown in FIG. 1 will be described below. The luminance signal obtained from the receiver set 101 is recorded for a period of any one frame on the target of the storage tube of the signal storage unit 102 which is deflected by a saw tooth wave generated by the deflection circuit 103. The state of the recorded signal is shown in FIG. 4a. The X and Z signals produced from the receiver set 101 are compressed, respectively, to their one-half time scale by means of the time axis compression circuit (such as a capacitor memory), and are recorded on the signal storage unit 110 having the same structure as that of the signal storage unit 102. The X signal is recorded on the left half of the recording surface and the Z signal is recorded on the right half as shown in FIG. 4b.

Reproduction is effected by scanning the target of the storage tube of the storage units 102, 110 with the saw tooth waveform signals produced continuously from the deflection circuit 103. The signal reproduced from the storage unit 110 is amplified through the signal amplifier circuit 111. The reproduced signal is then restored to the original time length through the time axis expansion and separation circuit 112. At this time, the X signal is expanded by itself without delay and the Z signal is expanded being delayed by ½ H. As for the 1 H delay of the luminance signal reproduced by the storage unit 102, the vertically deflected synchronizing signal of the storage tube for the luminance signal is read out being delayed by 1 H. The X and Z signals thus demodulated are applied to the matrix circuit 113 to produce R-Y signal, B-Y signal, and G-Y signal, which will be applied to the color CRT, to create a colored still picture image. Also, even if a luminance signal is used without being delayed by 1 H, low resolution of the chrominance signal does not impose any problem in practical use.

As mentioned above, any one frame of television picture can be recorded within one-thirtieth of a second, and the recorded signal can immediately be reproduced as a colored still picture. Furthermore, writing, erasing, reading out, etc. are performed all electronically, without requiring any mechanical operation, and this contributes to simple manipulation and high reliability. In addition, since the X signal and Z signal are being recorded by separating the signal storage tube into left and right sides, good separation of signals is obtained causing little deterioration in color quality. Besides, according to this invention, the apparatus for reproducing a colored still picture image can be provided in which as compared to the instance where the chrominance signal is recorded without being compressed in the time axis but being separated into up and down or right and left of the target of the storage tube, the deflection circuit is simplified and the circuits of the apparatus simplified since a complex delay circuit is not required.

What we claim is:

1. An apparatus for reproducing a colored still picture image comprising:

a first signal storage tube for recording the luminance signal, a circuit for compressing two kinds of chrominance signals in the time axis respectively, and for converting the compressed signals into time-sequential signals by alternately taking out the compressed signals, a second signal storage tube for recording the time-sequential signals, a circuit for expanding the signal read out from said second signal storage tube in the time axis, and for separating the signal into two kinds of chrominance signals, and means for reproducing a colored still picture from the two kinds of expanded and separated chrominance signals and from the signal read out from said first storage tube.

2. An apparatus for reproducing a colored still picture image as set forth in claim 1, wherein the circuit for compressing and converting the signals compresses each of the two chrominance signals in the time axis to half scale, and further the circuit for compressing and converting comprises means for delaying one of the two compressed chrominance signals by one-half of the horizontal scan period means for delaying the other chrominance signal by one horizontal scan period, and means for inserting the two compressed chrominance signals, each corresponding to the chrominance signal for one horizontal scanning period, in each horizontal scanning period.

3. An apparatus for reproducing colored still picture image as set forth in claim 2, wherein one of the two compressed chrominance signals is delayed by one-half of the horizontal scanning period and the other is delayed by one horizontal scanning period, said apparatus comprising means for converting the two compressed chrominance signals into the time-sequential signals, and said apparatus further comprising a means which delays the luminance signal reproduced by said first storage tube by one horizontal scanning period, and wherein a colored still picture is reproduced from said delayed luminance signal and the two chrominance signals obtained by said circuit for expanding and separating.

* * * * *